United States Patent [19]

Kobayashi

[11] 4,027,544
[45] June 7, 1977

[54] V-BELT VARIABLE-SPEED DRIVE

[75] Inventor: Takashi Kobayashi, Hamamatsu, Japan

[73] Assignee: Yamaha Hatsudoki Kabushiki Kaisha, Japan

[22] Filed: Apr. 23, 1976

[21] Appl. No.: 679,746

[30] Foreign Application Priority Data

June 19, 1975  Japan .................. 50-82668[U]

[52] U.S. Cl. ........................... 74/230.17 E
[51] Int. Cl.² ............................ F16L 55/52
[58] Field of Search .......... 74/230.17 E, 230.17 A, 74/230.17 R

[56] References Cited

UNITED STATES PATENTS

| | | | |
|---|---|---|---|
| 3,727,478 | 4/1973 | Erickson et al. | 74/230.17 E |
| 3,733,918 | 5/1973 | Domaas | 74/230.17 E |
| 3,808,900 | 5/1974 | Vadeboncoeur et al. | 74/230.17 E |
| 3,861,229 | 1/1975 | Domaas | 74/230.17 E |
| 3,961,539 | 6/1976 | Tremblay et al. | 74/230.17 E |

Primary Examiner—Samuel Scott
Assistant Examiner—Allan R. Burke
Attorney, Agent, or Firm—Flynn & Frishauf

[57] ABSTRACT

A V-belt variable-speed drive has a driving shaft; a stationary sheave fixedly mounted on the driving shaft; a sliding sheave assembly including a sliding sheave facing the stationary sheave and a casing covering the backside of the sliding sheave and designed to slide in the axial direction of the driving shaft, though normally urged to be set apart from the stationary sheave; self-sliding bearings for mounting the sliding sheave and casing on the driving shaft; a rotation-transmitting unit fixed to the driving shaft to transmit its rotation to the sliding sheave assembly while allowing the sliding sheave assembly to slide in the axial direction of the driving shaft; and a sliding sheave assembly-displacing unit for steplessly varying the rotating speed of a driven shaft by adjusting an interval between the stationary and sliding sheaves and regulating the radial position of the V-belt lying between both sheaves in accordance with the rotating speed of the driving shaft, wherein application of the self-aligning type bearings enables the sliding sheave assembly to be smoothly shifted in the axial direction of the driving shaft even when the V-belt applies a localized reaction force to the sliding sheave.

7 Claims, 4 Drawing Figures

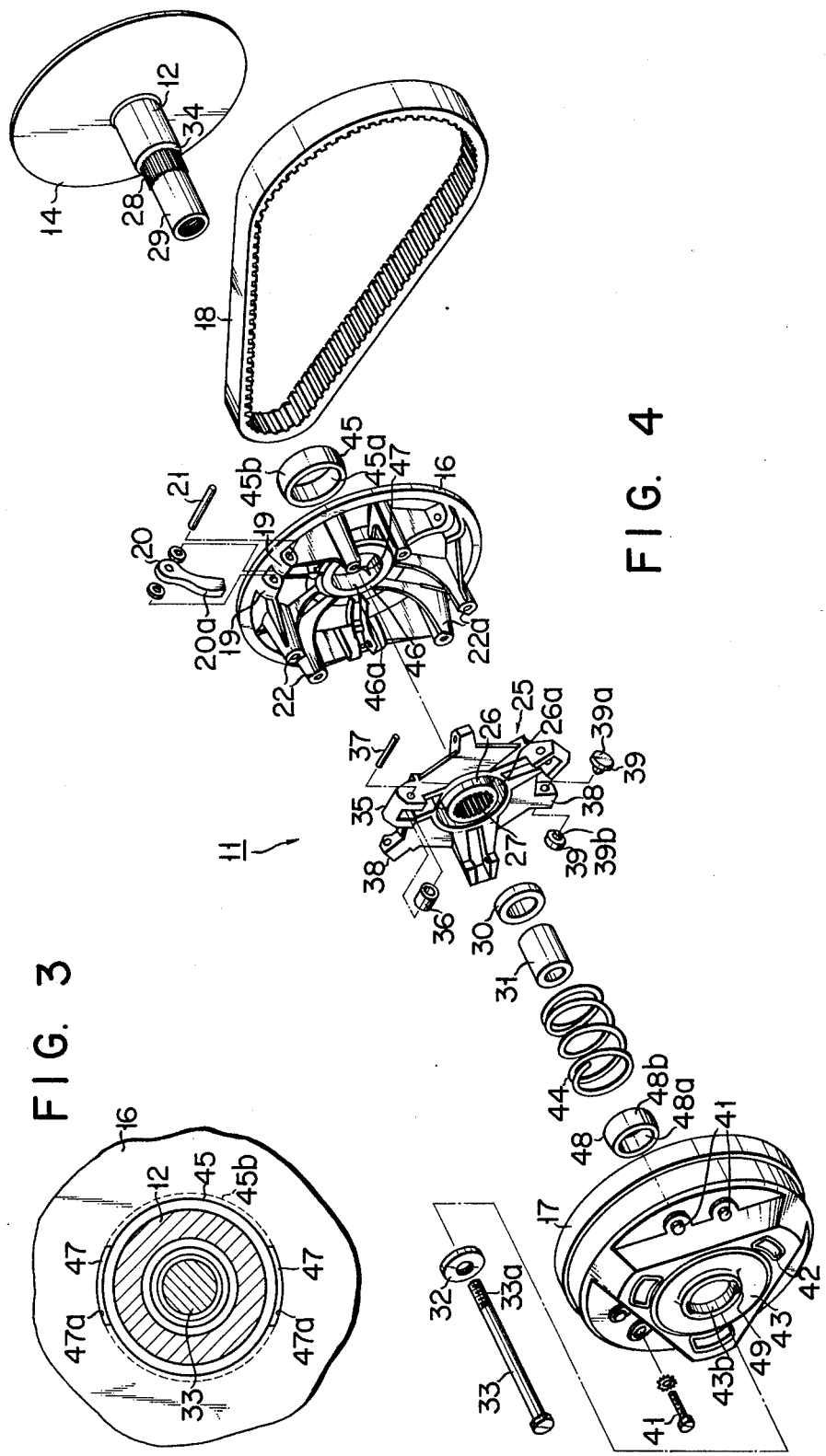

V-BELT VARIABLE-SPEED DRIVE

BACKGROUND OF THE INVENTION

1. Field of the Invention

This invention relates to an improved V-belt variable-speed drive and more particularly to the type which enables a sliding sheave to be smoothly shifted in an axial direction of a driving shaft even when the V-belt applies a localized reaction force to the sliding sheave.

2. Description of the Prior Art

With the prior art V-belt variable-speed drive, a hollow cylindrical bearing was provided between a sliding sheave and a driving shaft to shift the sliding sheave in the axial direction of the driving shaft. Consequently, the V-belt applied a localized reaction force to the sliding sheave due to the particular construction of the V-belt variable-speed drive. Both the bearing and sliding sheave were inclined relative to the driving shaft, causing the inner edge of the bearing remote from the stationary sheave to contact the peripheral wall of the driving shaft in an extremely small area, that is, to make an approximately point contact therewith.

Therefore, the conventional variable-speed drive had the drawbacks that the sliding sheave was shifted under varying conditions according to that part of the periphery of the driving shaft against which the inner edge of the bearing abutted, not only considerably reducing the exact responsiveness of the sliding sheave to the rotating speed of the driving shaft, but also leading to the too easy abrasion of the bearing and driving shaft.

SUMMARY OF THE INVENTION

It is accordingly an object of this invention to provide a V-belt variable-speed drive having self-aligning type bearings disposed between the sliding sheave assembly and driving shaft, thereby enabling the sliding sheave assembly to be smoothly shifted in the axial direction of the driving shaft even when the V-belt applies a localized reaction force to the sliding sheave.

Another object of this invention is to provide a V-belt variable-speed drive including grooved bearing-inserting sections capable of detachably fitting the bearings to the sliding sheave.

Still another object of the invention is to provide a V-belt variable-speed drive which enables easy maintenance without overhauling the sliding sheave.

A V-belt variable-speed drive according to this invention comprises a driving shaft, a stationary sheave fixed to the driving shaft and a sliding sheave assembly slidable in the axial direction of the driving shaft, though normally urged to be set apart from the stationary sheave. The sliding sheave assembly comprises a sliding sheave facing the stationary sheave and preferably a casing covering the backside of the sliding sheave. Both sheaves hold a V-belt therebetween.

A bearing disposed between a hub of the sliding sheave and the driving shaft and a bearing lying between a hub of the casing and the driving shaft or a sleeve mounted on the driving shaft respectively have a cylindrical inner surface complementary to the outer periphery of the driving shaft or sleeve and a spherical outer wall whose center lies on the axis of the driving shaft. The spherical outer walls of both bearings contact the spherical inner walls of the hubs of the corresponding sliding sheave and casing. Even when the V-belt applies a localized reaction force to the sliding sheave, the spherical outer walls of the bearings contacting the spherical inner walls of the hubs of the corresponding sliding sheave and casing prevent the bearings from being inclined relative to the driving shaft or sleeve. Accordingly, the bearings smoothly slide in the axial direction of the driving shaft, presenting no obstruction in the movement of the sliding sheave assembly in said axial direction.

In a preferred arrangement, a plurality of pairs of sliding arms extend from the backside of the sliding sheave parallel with the driving shaft. In this case, it is preferred that the sliding arms of the respective pairs be spaced from each other at a prescribed interval and the mutually facing sides of the sliding arms be parallel with each other.

In the sliding sheave assembly, a unit for transmitting the rotation of the driving shaft is fixed thereto. The unit preferably has a plurality of guide arms radially extending from the hub of said unit to the aforesaid sliding arms corresponding to the guide arms. The outer end of each radially extending guide arm is fitted with a guide member abutting against the mutually facing surfaces of the corresponding pairs of sliding arms, allowing the sliding arms to slide over the guide members in the axial direction of the driving shaft. Therefore, cooperation between the sliding arms and guide arms enable the sliding sheave assembly to slide along the driving shaft and to also rotate therewith.

In a further preferred arrangement, a plurality of cammed weight members are pivoted at one end respectively to the sliding sheave. The cam surfaces of these weight members are pressed against rollers included in the driving shaft rotation-transmitting unit to shift the sliding sheave nearer to the stationary sheave against an urging force acting to move the sliding sheave along from the stationary sheave, as the driving shaft is rotated at a more accelerated speed. As the result, an interval between the sliding sheave and the stationary sheave is progressively reduced, steplessly varying the rotating speed of a driven shaft.

BRIEF DESCRIPTION OF THE DRAWING

FIG. 3 is a fractional view on line 3—3 of FIG. 2, showing a portion of a bearing received in the sliding sheave; and FIG. 4 is an exploded perspective view of a V-belt variable-speed drive of FIG. 1.

DETAILED DESCRIPTION OF THE PREFERRED EMBODIMENTS

Figure 1:
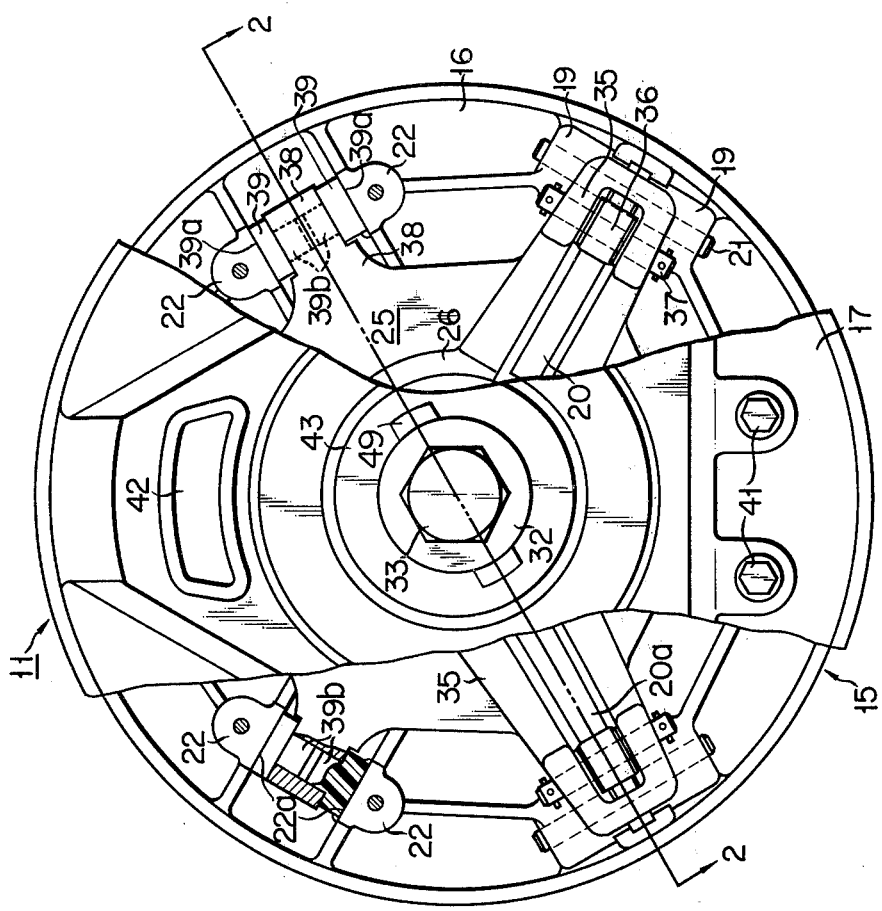
FIG. 1 is a partially broken end elevational view of a V-belt variable-speed drive embodying this invention.
Figure 2:
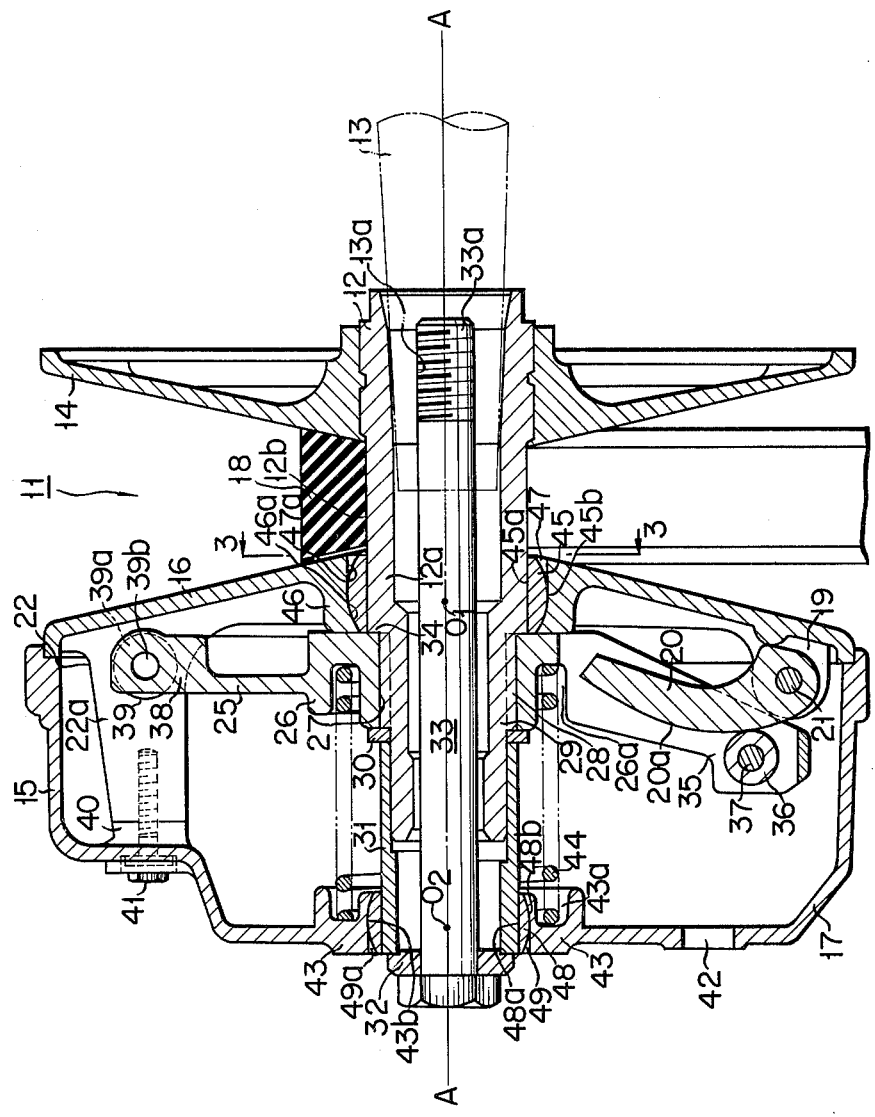
FIG. 2 is a cross sectional view on line 2—2 of FIG. 1.

Referring to FIGS. 2 and 4, a V-belt variable-speed drive 11 according to this invention comprises a hollow driving shaft 12 into which a crank shaft 13 is fitted; a conical stationary sheave 14 concentrically fitted to one end of the hollow drive shaft 12; and a sliding sheave assembly 15 disposed to face the stationary sheave 14, mounted on the hollow driving shaft 12, and designed to slide in the axial direction of the shaft 12 and rotate therewith.

The sliding sheave assembly 15 comprises a conical sliding sheave 16 concentrically mounted on an intermediate part 12a of the driving shaft 12 by means of a later described bearing so as to face the stationary sheave 14 and slide in the axial direction of the hollow driving shaft 12; and a casing 17 for covering the backside of the sliding sheave 16. An endless V-belt 18 passes between both stationary and sliding sheaves 14, 16. This V-belt 18 also passes between another stationary sheave mounted on a driven shaft (not shown) and another sliding sheave (not shown) also mounted on the driven shaft so as to face said another stationary sheave and slide in the axial direction of the driven shaft, thereby transmitting the rotation and torque of the driving shaft 12 to the driven shaft through the stationary and sliding sheaves 14, 16, V-belt 18 and the and sliding sheaves mounted on the driven shaft.

A plurality of pairs (three pairs in this embodiment) of flanges 19 are arranged at an equal circumferential distance alongside the periphery of the backside of the sliding sheave 16. One end of a cammed weight member 20 is inserted between the flanges 19 of each pair and pivotally supported on the flanges 19 by a pin 21 passing therethrough. The other end portion of each weight member 20 is directed to the center of the sliding sheave 16. A plurality of pairs (three pairs in this embodiment) of sliding arms 22 project parallel with the driving shaft 12 from the center of those portions of the backside of the sliding sheave 16 which are defined between every adjacent pairs of flanges 19. The mutually facing parallel sliding planar surfaces 22a of each pair of sliding arms 22 are spaced from each other at a prescribed distance.

Referring to FIG. 2, a driving shaft rotation-transmitting unit denoted by a general referential numeral 25 is mounted on the driving shaft 12 and has serrated grooves 27 formed in the wall of a hole bored at the center of a hub 26 of the unit 25. Serrations 28 provided in a reduced diameter section 29 following the intermediate part 12a of the driving shaft 12 are fitted into the serrated grooves 27. This arrangement enables the driving shaft rotation-transmitting unit 25 to rotate with the driving shaft 12.

A washer 30 abuts against the left end of the hub 26 of the driving shaft rotation-transmitting unit 25. A sleeve 31 following the washer 30 covers that part of the reduced diameter section 29 which is not provided with the serrated grooves 27, and further extends to the left from the left end of the driving shaft 12. The left end of the sleeve 31 is covered with a ring-shaped end member 32. A long bolt 33 passes through the end member 32, sleeve 31 and driving shaft 12. A male screw portion 33a formed at the forward end portion of the bolt 33 is fitted into a female screw portion 13a formed in the left end portion of the crank shaft 13. Accordingly, the driving shaft rotation-transmitting unit 25 is held between the washer 30 and a shoulder portion 34 defined by the intermediate part 12a and reduced diameter section 29 of the driving shaft 12, and is prevented from being moved in the axial direction of the driving shaft 12.

The driving shaft rotation-transmitting unit 25 has a plurality of (three in this embodiment) inverted U-shaped roller holders 35 radially projecting from the hub 26 at an equal circumferential distance to face the corresponding flanges 19 of the sliding sheave 16. A roller 36 is pivotally supported by a pin 37 at the outer end portion of the roller holder 35. The roller 36 is contacted by the cam surface 20a of the corresponding weight member 20. The cam surface 20a is so shaped as to swing through an angle corresponding to the rotating speed of the driving shaft 12 and draw the sliding sheave 16 toward the stationary sheave 14 until an interval therebetween is brought to a precribed distance.

The driving shaft rotation-transmitting unit 25 further has a plurality of (three in this embodiment) guide arms 38 each projecting from between every adjacent roller holders 35 to be inserted between the mutually facing parallel planar surfaces 22a of the corresponding pair of sliding arms 22. Each guide arm 38 is pentrated by shaft portions 39b formed on a pair of guide members 39 and having an outer end face 39a made flat for abutment against the mutually facing parallel planar surfaces 22a of the corresponding pair of sliding arms 22.

The casing 17 of the sliding sheave assembly 15 covers all the parts fitted to the backside of the sliding sheave 16 and driving shaft rotation-transmitting unit 25. The sliding arms 22 and casing 17 are fixed together by bolts 41 with the outer end of each sliding arm 22 pressed against the corresponding boss 40 formed on the inner wall fo the casing 17. Viewing windows 42 are provided in the end wall of the casing 17 to enable the interior of the sliding sheave assembly 15 to be examined from the outside without disassembling the assembly 15. A helical compression spring 44 is disposed between a spring seat 43a formed in a hub 43 of the casing 17 and a spring seat 26a provided in the hub 26 of the driving shaft rotation-transmitting unit 25. This helical compression spring 44 urges the sliding sheave 16 to be set apart from the V-belt 18 through the casing 17.

Provided at the intermediate part 12a of the driving shaft 12 is an axially slidable bearing 45 having a cylindrical inner surface 45a whose inner diameter is substantially equal to the outer diameter of the driving shaft 12 and a spherical outer peripheral surface 45b whose center $0_1$ falls on the central line A—A of the driving shaft 12.

The hub 46 of the sliding sheave 16 has a central hole whose center is aligned with the center $0_1$ of the bearing 45 and a spherical inner wall 46a complementary to the outer peripheral wall 45b of the bearing 45. The hub 46 of the sliding sheave 16 is provided, as shown in FIGS. 2 and 4, with a pair of bearing-inserting section 47 open to the V-belt 18, shaped like keyways or slits and arranged symmetrical with each other relative to the axis A—A of the driving shaft 12. Each bearing-inserting section 47 has a slightly larger width than that of the bearing 45. The outer peripheral wall 47a of each bearing-inserting section 47 extends toward the V-belt 18 at the same height as the central largest diameter portion of the inner spherical wall 46a of the hub 46 of the sliding sheave 16.

Mounted on the rear end of the sleeve 31 is a bearing 48 slidable in the axial direction of the driving shaft 12. This bearing 48 has a cylindrical inner surface 48a whose inner diameter is substantially equal to the outer diameter of the sleeve 31 and an outer sperical wall 48b whose center $0_2$ falls on the axis A—A of the driving shaft 12 and sleeve 31.

The central hole of the hub 43 of the casing 17 has a spherical inner wall 43b whose center is aligned with the center $0_2$ of the outer peripheral wall 48b of the bearing 48 and which is shaped complementary to the outer periphery of the bearing 48. The hub 43 is further provided, as shown in FIG. 2, with a pair of bearing-inserting sections 49 open to the outside of the casing 17, shaped like keyways or slits, and arranged symmetrical with each other relative to the axis A—A of the driving shaft 12. These bearing-inserting sections 49 have a slightly larger width than that of the bearing 48. The outer pheripheral wall 49a of each bearing-inserting inserting section 49 extends rearward at the same heights as the intermediate largest diameter section of the spherical inner wall 43b of the hub 43 of the casing 17. The bearing-inserting sections 47, 49 have a similar construction, as seen from the foregoing description.

The bearings 45, 48 are inserted into the corresponding bearing-inserting section 47, 49 with the axis of the bearings 45, 48 positioned at right angles to the axis A—A of the driving shaft 12. When the axis of the bearings 45, 48 is turned through an angle of 90° to fall on the axis A—A of the driving shaft 12 and then the sliding sleeve 16 and casing 17 are mounted on the driving shaft 12 and sleeve 31, the bearings 45, 48 are fitted, as shown in FIG. 2, into the central hole of the hub 46 of the sliding sheave 16 and the central hole of the hub 43 of the casing 17 respectively. Therefore, though rotatable relative to the corresponding hubs 46, 43, the bearings 45, 48 are prevented from being moved in the axial direction of the driving shaft 12 and in consequence, are prevented from being thrown out of the corresponding hubs 46, 43. Provision of the above-mentioned bearing-inserting sections 47, 49 facilitates, as easily understood, the fitting of the spherical bearings 45, 48.

The V-belt variable-speed drive 11 is assembled further through the following operations. After the bearing 45 is inserted into the hub 46, the sliding sheave 17 is mounted on the intermediate part 12a of the driving shaft 12. The serrations 28 of the driving shaft 12 are fitted into the serrated grooves 27 of the driving shaft rotation-transmitting unit 25. The washer 30 and sleeve 31 are mounted on the rear portion of the reduced diameter section 29 of the driving shaft 12. One end of the spring 44 is inserted into the spring seat 26a of the hub 26 of the driving shaft rotation-transmitting unit 25. Under this condition, the casing 17 whose hub 43 has received the bearing 48 is mounted on the rear end of the sleeve 31 with the spring 44 received in the spring seat 43a of the hub 43a of the casing 17. The rear end of the sleeve 31 is covered with the end member 32. Finally when the bolts 33 are tightened to the crank shaft 13, the assembly of the V-belt variable-speed drive 11 is completed. The end member 32 has a larger diameter than the outer diameter of the sleeve 31.

The sliding sheave assembly 15 constructed as designed above has the advantages that the assembly 15 can be removed from the variable-speed drive 11 simply by taking off the bolt 33 and end member 43 without being overhauled, admitting of easy maintenance and particularly the bearings 45, 48, when worn out, can be exchanged for fresh ones without dismounting the sliding sheave assembly 15.

There will now be described the operation of the V-belt variable-speed drive 11 embodying this invention. When the driving shaft 12 and in consequence the driving shaft rotation-transmitting unit 25 are rotated, the sliding sheave assembly 15 including the sliding sheave 16 is rotated at the same speed as the driving shaft 12 by means of the guide arms 38, guide members 39 mounted thereon and sliding arms 22. A centrifugal force resulting from the above-mentioned rotation causes the weight members 20 to rotate counterclockwise about the pin 21 of FIG. 2 and consequently push rollers 36. As the result, the sliding sheave assembly 15 is shifted to the right against the biasing force of the spring 44 while compressing the spring 44. Thus, the sliding sheave 16 is progressively drawn nearer to the stationary sheave 14, allowing the V-belt 18 to be moved up the mutually facing surfaces of both sheaves 14, 16. The distance between both sheaves 14, 16 and the extent to which the V-belt 18 is raised are determined by a balance between that component of the centrifugal force of the weight members 20 applied to the rollers 36 abutting against the cam surfaces 20a of the weight members 20 which acts in parallel with the driving shaft 12 and a sum of mainly the urging force of the spring 44 and that component of the tensional force of the V-belt 18 which also acts in parallel with the driving shaft 12. In other words, the faster the rotation of the driving shaft 12, the shorter the distance between the sheaves 14, 16 and consequently the more raised the V-belt 18. Conversely, when the rotation of the driving shaft 12 slows down, the sheaves 14, 16 are more widely spaced, leading to the fall of the V-belt 18, and enabling the rotating speed of the driven shaft to be steplessly varied with that of the driving shaft 12.

While the driving shaft 12 is rotating, the upper half portion of the sliding sheave 16 of FIG. 2 is supplied from the V-belt 18 with the reaction of a force applied to press the V-belt 18. In contrast, the lower half portion of the sliding sheave 16 which is not engaged with the V-belt 18 is free from the abovementioned reaction force. Eventually, the sliding sheave 16 which is partly pushed is urged counterclockwise of FIG. 2 by the aforesaid reaction force.

The outer peripheral wall 45b of the bearing 45 is a part of a sphere centered at $0_1$. The inner peripheral wall 46a of the hub 46 of the sliding sheave 16 is shaped complementary to the outer peripheral wall 45a of the bearing 45. Therefore, the aforesaid reaction causes the innner peripheral wall 46a of the hub 46 of the sliding sheave 16 to slide over the outer peripheral wall 45b of the bearing 45 and be slightly inclined counterclockwise. Since, the bearing 45 itself is little inclined relative to the axis of the driving shaft 12, a substantially linear contact (more correctly, contact in the form of a narrow band due to the elastic deformation of the contact portions) is maintained between the lower portion of the cylindrical inner wall 45a of the bearing 45 and the lower portion of the outer portion of the outer peripheral wall 12b of the intermediate part 12a of the driving shaft 12. Likewise, a substantially linear contact is maintained between the upper portion of the cylindrical inner wall 48a of the bearing 48 and the upper portion of the outer periphery of the sleeve 31. Accordingly, there is attained the very smooth shifting of the sliding sheave 16 in the axial direction of the driving shaft 12 and little abrading of the outer peripheral wall 12b of the driving shaft 12, the outer periphery of the sleeve 31, and the cylindrical inner walls 45a, 48a of the bearings 45. The foregoing description exactly applies to the bearing 48 coacting with the inner peripheral wall 43b of the casing 17. Both bearings 45, 48 are of the self-aligning type.

In constrast, with the known variable speed drive, both upper and lower surfaces of a bearing disposed between the sliding sheave and driving shaft are cylindrical. Therefore, when the sliding sheave is inclined relative to the driving shaft by the reaction applied by the V-belt, then the bearing itself is also inclined. One inner edge of the bearing makes a point contact (more correctly, contact between small areas near the contact spots due to the elastic deformation thereof) with the driving shaft, giving rise to the local abrasion of the bearing and driving shaft and obstructing the shifting of the sliding sheave in the direction of the driving shaft.

What is claimed is:

1. A V-belt variable-speed drive comprising:
   a driving shaft;
   a stationary sheave concentrically fixed to said driving shaft;
   sliding sheave means having a sliding sheave facing the stationary sheave and supported by at least two central portions penetrated by the driving shaft, said central portions having a spherical inner surface;
   at least two bearings mounted on the driving shaft and being slideable axially thereof, each of the bearings having a cylindrical inner surface which contacts the outer surface of the driving shaft and each of the bearings having a spherical outer surface shaped complementary to the inner surfaces of said central portions of the sliding sheave means, the complementary spherical outer surface of the respective bearings being concentered as the spherical surfaces of said central portions of the sliding sheave means, and said bearings being inserted into the corresponding central portions of the sliding sheave means with the sperical outer surface of said bearings being contacted by the spherical inner surface of the corresponding central portions;
   an endless belt passing between the stationary sheave and the sliding sheave;
   rotation-transmitting means disposed between the driving shaft and the sliding sheave means to transmit the rotation of the driving shaft to the siding sheave;
   displacing means disposed between the driving shaft rotation-transmitting means and the sliding sheave means to draw the sliding sheave nearer to the stationary sheave as the driving shaft is rotated at a more accelerated speed; and
   urging means for urging the sliding sheave in the direction in which the sliding sheave is separated from the stationary sheave.

2. A V-belt variable-speed drive according to claim 1, wherein said sliding sheave means includes a casing for covering the rear side of the sliding sheave, and said central portions of said sliding sheave means respectively comprise the hubs of the sliding sheave and the casing.

3. A V-belt variable-speed drive according to claim 2, wherein each of said hubs of the sliding sheave and the casing is provided with a pair of slit shaped bearing-inserting sections arranged symmertrical with each other with respect to the axis of the driving shaft, each of said bearing inserting sections having a width slightly larger than the width of the corresponding bearing and extending along the driving shaft.

4. A V-belt variable-speed drive according to claim 2, wherein said driving shaft rotation-transmitting means comprises a plurality of pairs of sliding arms arranged at an equal circumferential distance and projecting from the sliding sheave to depart from the stationary sheave, said sliding arms having mutually facing inner surfaces, and a driving shaft rotation-transmitting unit fixed to the driving shaft and provided with guide arms extending outward radially between the corresponding paired sliding arms for contact with the mutually facing inner surfaces of said sliding arm.

5. A V-belt variable-speed drive according to claim 4, wherein said driving shaft rotation-transmitting unit includes respective rollers rotatably coupled to end portions of said guide arms, and said displacing means comprises a plurality of cammed weight members pivotally mounted to the sliding sheave, said cammed weight members having respective cam surfaces for contacting said rollers of the driving shaft rotation-transmitting unit.

6. A V-belt variable-speed drive according to claim 4, wherein said driving shaft rotation-transmitting means is provided in the sliding sheave means.

7. A V-belt variable-speed drive according to claim 6, wherein there is provided a viewing window on the casing for observing the internal operation thereof.

* * * * *